United States Patent
Montojo et al.

(10) Patent No.: US 8,780,816 B2
(45) Date of Patent: Jul. 15, 2014

(54) HANDLING UPLINK GRANT IN RANDOM ACCESS RESPONSE

(75) Inventors: Juan Montojo, San Diego, CA (US); Arnaud Meylan, Bois-Colombes (FR)

(73) Assignee: QUALCOMM Incorporated, San Diego, CA (US)

(*) Notice: Subject to any disclaimer, the term of this patent is extended or adjusted under 35 U.S.C. 154(b) by 514 days.

(21) Appl. No.: 12/501,235

(22) Filed: Jul. 10, 2009

(65) Prior Publication Data

US 2010/0040001 A1 Feb. 18, 2010

Related U.S. Application Data

(60) Provisional application No. 61/088,308, filed on Aug. 12, 2008, provisional application No. 61/088,327, filed on Aug. 12, 2008.

(51) Int. Cl.
*H04W 72/04* (2006.01)

(52) U.S. Cl.
USPC ........... 370/329; 370/330; 370/311; 370/338; 370/348

(58) Field of Classification Search
USPC .................. 370/329, 330, 338, 348; 455/450
See application file for complete search history.

(56) References Cited

U.S. PATENT DOCUMENTS

| | | | |
|---|---|---|---|
| 6,950,399 B1 * | 9/2005 | Bushmitch et al. | 370/236 |
| 7,321,589 B2 | 1/2008 | Lohr et al. | |
| 7,426,394 B2 | 9/2008 | Rinne | |
| 7,436,795 B2 | 10/2008 | Jiang | |
| 7,693,156 B2 | 4/2010 | Liljestrom et al. | |
| 7,848,308 B2 | 12/2010 | Lee et al. | |
| 7,899,075 B2 | 3/2011 | Whitehead et al. | |

(Continued)

FOREIGN PATENT DOCUMENTS

| | | |
|---|---|---|
| CN | 1878052 A | 12/2006 |
| EP | 1009184 A2 | 6/2000 |

(Continued)

OTHER PUBLICATIONS

3GPP: "3GPP Ts 36.321 V8.2.0 (May 2008); 3rd Generation Partnership Project; Technical Specification Group Radio Access Network; Evolved Universal Terrestrial Radio Access (E-UTRA) Medium Access Control (MAC) protocol specification (Release 8)" 3rd Generation Partnership Project (3GPP); Technicalspecification (TS), XX, XX, No. TS 36.321 V8.2.0, May 1, 2008, pp. 1-33, XP002554062.

(Continued)

*Primary Examiner* — Ricky Ngo
*Assistant Examiner* — Rasheed Gidado
(74) *Attorney, Agent, or Firm* — Liem T. Do

(57) ABSTRACT

A wireless communication system provides for a random access channel (RACH) procedure for user equipment (UE) to request access to an uplink channel. From a physical layer perspective, an evolved Base Station (eNB) responds with a random access preamble and a random access response (RAR) of a fixed length message, such as 21 bits or 20 bits with a reserved bit for future extensions. In answer to a need that exists for an RAR to accommodate variations in system bandwidth, an approach to encoding a truncated resource block (RB) assignment of the RAR in manner in which the UE can interpret the RAR without loss of information. Thereby, needs for achieving RACH procedures and existing channel resources can be realized.

40 Claims, 9 Drawing Sheets

(56) References Cited

U.S. PATENT DOCUMENTS

| | | | |
|---|---|---|---|
| 7,961,680 B2 | 6/2011 | Park et al. | |
| 8,081,606 B2 | 12/2011 | Cai et al. | |
| 2002/0091831 A1 | 7/2002 | Johnson | |
| 2005/0135318 A1 | 6/2005 | Walton et al. | |
| 2005/0186959 A1 | 8/2005 | Vialen et al. | |
| 2007/0093209 A1 | 4/2007 | Agrawal et al. | |
| 2007/0133458 A1* | 6/2007 | Chandra et al. | 370/329 |
| 2007/0206531 A1 | 9/2007 | Pajukoski et al. | |
| 2007/0245202 A1 | 10/2007 | Kim et al. | |
| 2007/0258540 A1* | 11/2007 | Ratasuk et al. | 375/267 |
| 2008/0049851 A1* | 2/2008 | Nangia et al. | 375/260 |
| 2008/0130588 A1 | 6/2008 | Jeong et al. | |
| 2008/0232283 A1 | 9/2008 | Jen | |
| 2008/0232317 A1 | 9/2008 | Jen | |
| 2008/0232329 A1 | 9/2008 | Jen | |
| 2008/0233940 A1 | 9/2008 | Jen | |
| 2008/0233941 A1 | 9/2008 | Jen | |
| 2008/0233964 A1* | 9/2008 | McCoy et al. | 455/450 |
| 2008/0235314 A1 | 9/2008 | Lee et al. | |
| 2008/0273610 A1 | 11/2008 | Malladi et al. | |
| 2009/0003274 A1* | 1/2009 | Kwak et al. | 370/329 |
| 2009/0041240 A1* | 2/2009 | Parkvall et al. | 380/247 |
| 2009/0141661 A1* | 6/2009 | Li et al. | 370/311 |
| 2009/0156194 A1 | 6/2009 | Meylan | |
| 2009/0175253 A1 | 7/2009 | Wu et al. | |
| 2009/0201868 A1* | 8/2009 | Chun et al. | 370/329 |
| 2009/0203377 A1 | 8/2009 | Kawasaki | |
| 2009/0252093 A1* | 10/2009 | Frenger | 370/329 |
| 2009/0323607 A1 | 12/2009 | Park et al. | |
| 2010/0008242 A1 | 1/2010 | Schein | |
| 2010/0034162 A1 | 2/2010 | Ou et al. | |
| 2010/0037113 A1 | 2/2010 | Maheshwari et al. | |
| 2010/0074204 A1 | 3/2010 | Meylan | |
| 2010/0085927 A1 | 4/2010 | Torsner et al. | |
| 2010/0093386 A1 | 4/2010 | Damnjanovic et al. | |
| 2010/0128648 A1 | 5/2010 | Lee et al. | |
| 2010/0135229 A1* | 6/2010 | Lohr et al. | 370/329 |
| 2010/0142470 A1 | 6/2010 | Park et al. | |
| 2010/0197315 A1* | 8/2010 | Lindstrom et al. | 455/450 |
| 2010/0272035 A1 | 10/2010 | Park et al. | |
| 2010/0309877 A1 | 12/2010 | Damnjanovic et al. | |
| 2010/0323736 A1 | 12/2010 | Fischer et al. | |
| 2010/0331003 A1 | 12/2010 | Park et al. | |
| 2011/0032891 A1 | 2/2011 | Lee et al. | |
| 2011/0170503 A1 | 7/2011 | Chun et al. | |
| 2011/0182245 A1 | 7/2011 | Malkamaki et al. | |

FOREIGN PATENT DOCUMENTS

| | | |
|---|---|---|
| EP | 1784036 A1 | 5/2007 |
| JP | 2009535966 A | 10/2009 |
| RU | 2280929 C1 | 7/2006 |
| RU | 2304348 C2 | 8/2007 |
| RU | 2313197 C2 | 12/2007 |
| TW | I362850 B | 4/2012 |
| WO | WO2004064272 A1 | 7/2004 |
| WO | 2006099225 A1 | 9/2006 |
| WO | 2007011180 A1 | 1/2007 |
| WO | WO2007052972 A1 | 5/2007 |
| WO | WO2007091831 | 8/2007 |
| WO | 2007116985 A1 | 10/2007 |
| WO | 2007119542 A1 | 10/2007 |
| WO | WO2007126302 A1 | 11/2007 |
| WO | 2008042889 A1 | 4/2008 |
| WO | WO2008041936 A1 | 4/2008 |
| WO | 2008050428 A1 | 5/2008 |
| WO | WO2008055235 | 5/2008 |
| WO | 2008085959 A1 | 7/2008 |

OTHER PUBLICATIONS

3GPP: "Technical Specification Group Radio Access Network; Evolved Universal Terrestrial Radio Access (E-UTRA) Medi urn Access Control (MAC) protocol specification (Rel ease 8)" Internet Citation, [Online] pp. 13-20, XP002539526 Retrieved from the Internet: URL: http://www.3gpp.org/ftp/Specs/archive/36-seri es/36.321/> [retrieved on Aug. 31, 2009] p. 16, paragraph 5.3.1 p. 17, paragraph 5.3.2.2.

Amitava Ghosh et al: "Random Access Design for UMTS Air-Interface Evolution" Vehicular Technology Conference, 2007. VTC2007-Spring. IEEE 65TH, IEEE, PI , Apr. 1, 2007, pp. 1041-1045, XP031092788 ISBN: 978-1-4244-0266-3.

Ericsson, "Format of Random Access Response", 3GPP TSG-RAN WG#60, Tdoc R2-074938, Jeju Korea, Nov. 5-9, 2007.

Huawei: "HARQ process Id of DL persistent scheduling" 3GPP Draft; R2-083518, 3rd Generation Partnership Project (3GPP), Mobile Competence Centre ; 650, Route Des Lucioles ; F-06921 Sophia-Antipolis Cedex ; France, vol. RAN WG2, No. Warsaw, Poland; 20080624, Jun. 24, 2008, XP050140894 [retrieved on Jun. 24, 2008].

International Search Report and Written Opinion—PCT/US2009/053565—ISA/EPO—Nov. 30, 2009.

LG Electronics Inc: "Handling of Received UL Grant in RA procedure" Aug. 12, 2008, 3GPP Draft; R2-084388 CR on Handling of Received UL Grant in RA PrOcedure_R1, 3rd Generation Partnership Project (3GPP), Mobile Competence Centre ; 650, Route Des Lucioles ; F-06921 Sophia-Antipolis Cedex ; France , XP050319458 [retrieved on Aug. 12, 2008].

LG Electronics Inc: "Handling of Received UL Grant in RA procedure" 3GPP Draft; R2-084387 Handling of Received UL Grant in RA PrOcedure_R1, 3rd Generation Partnership Project (3GPP), Mobile Competence Centre ; 650, Route Des Lucioles ; F-06921 Sophia-Antipolis Cedex ; France, No. Jeju; 20080812, Aug. 12, 2008, XP050319457.

LG Electronics Inc: "Re-Transmission of Persistent Scheduling" 3GPP Draft; R2-082260 Retransmission of Persistent Scheduling, 3rd Generation Partnership Project (3GPP), Mobile Competence Centre ; 650, Route Des Lucioles ; F-06921 Sophia-Antipolis Cedex; France, vol. Ran WG2, No. Kansas City, USA; 20080429, Apr. 29, 2008, XP050140021 [retrieved on Apr. 29, 2008].

Motorola: "LTE Random Access Procedure", 3GPP TSG-RAN WG2#53, [On line] vol. R2-061463, May 8-12, 2006, p. 1-4 XP007905045 Shanghai, China URL:http://www.3gpp.org/ftp/tsg_ran/WG2_RL2/TSGR2_53/Documents/>.

Park et al., U.S. Appl. No. 60/945,090, filed Jun. 19, 2007, pp. 1-3, "Method Related to Controlling Wireless Resources and Transmitting Data in a Wireless Communication System".

Park et al., U.S. Appl. No. 60/983,563, filed Oct. 29, 2007, pp. 1-13, "Handling of HFN Desynchronization".

Qualcomm Europe et al: "Handling of Uplink Grant in Random Access Response" 3GPP Draft; R1-083186, 3rd Generation Partnership Project (3GPP), Mobile Competence Centre ; 650, Route Des Lucioles ; F-06921 Sophia-Antipolis Cedex ; France, No. Jeju; Aug. 13, 2008, XP050316617.

Qualcomm Europe: "Handling of Uplink Grant in Random Access Response" 3GPP Draft; R1-083186, 3rd Generation Partnership Project (3GPP), Mobile Competence Centre ; 650, Route Des Lucioles ; F-06921 Sophia-Antipolis Cedex ; France, No. Jeju; Aug. 13, 2008, XP050316617.

Qualcomm Europe: "NDI and Message 3" 3GPP Draft; R2-084156 NDI and MSG3, 3rd Generation Partnership Project (3GPP), Mobile Competence Centre ; 650, Route Des Lucioles ; F-06921 Sophia-Antipolis Cedex ; France, No. Jeju; 20080812, Aug. 12, 2008, XP050319292.

Universal Mobile Telecommunications System (UMTS); Medium Access Control (MAC) protocol specification (3GPP TS 25.321 version 7.8.0 Release 7);ETSI TS 125 321 ETSI Standards, Lis, Sophia Antipolis Cedex, France, vol. 3-R2, No. V7.8.0, Apr. 1, 2008, XP014041738 ISSN: 0000-0001 p. 89, paragraph 11.6.2.1—p. 90, paragraph 11.6.2.2 p. 96, paragraph 11.6.3.3. p. 97, paragraph 11.6.4.2.

Qualcomm Europe, "PRACH and Message3 power control", 3GPP TSG-RAN WG1 #53bis, R1-082551, Jun. 30-Jul. 4, 2008, Warsaw, Poland.

(56) References Cited

OTHER PUBLICATIONS

Rani, "Reply to RAN2 LS on RACH Power Control Optimisation Use case", 3GPP TSG RAN WG2 Meeting #61 R2-080652, Sorrento, Italy, Feb. 11-15, 2008.

TSG-RAN WG1, "LS reply on PDCCH for DL data arrival and random access response format", 3GPP TSG RAN WG2 Meeting #62bis, R2-083061, Warsaw, Poland, Jun. 30-Jul. 4, 2008.

TSG RAN Wg 2, "Uplink grant format in Random Access Response" 3GPP TSG-RAN WG2 Meeting #62bis, R2-083779, Jun. 30-Jul. 4, 2008, Warsaw Poland.

Ericsson, "LTE PDCP Header Content", TSG-RAN WG2 Meeting #59bis, R2-074477, Shanghai, China, Oct. 8-12, 2007.

3GPP; Technical Specification Group Radio Access Network;: "TS 36.300 V8.2.0—Evolved Universal Terrestrial Radio Access (E-UTRA) and Evolved Universal Terrestrial Radio Access Network (E-UTRAN) ; Overall description ; Stage 2" 3rd Generation Partnership Project; Technical Specification (TS), vol. 36.300, No. v8.2.0, Sep. 1, 2007, XP002595686.

3GPP TS 36.321 v2.0.0 (Nov. 2007) 3rd Generation Partnership Project; Technical Specification Group Radio Access Network; Evolved Universal Terrestrial Radio Access (E-UTRA) Medium Access Control (MAC) protocol specification (Release 8) vol. 36.321, Nr:V2.0.0, pp. 1-23 XP002521802.

LG Electronics Inc, "NDI and Msg3", 3GPP TSG-RAN2 Meeting #62bis R2-083723, Jun. 30, 2008, pp. 1-3.

"Universal Mobile Telecommunications System (UMTS); Medium Access Control (MAC) protocol specification (3GPP TS 25.321 version 7.9.0 Release 7); ETSI TS 125 321" ETSI Standard, European Telecommunications Standards Institute (ETSI), Sophia Antipolis Cedex, France, vol. 3-R2, No. V7.9.0, Jul. 1, 2008, XP014042116 cited in the application paragraph [11.2.1] paragraph [11.2.2] paragraph [11.2.3].

LG Electronics: "Optimized RA response reception", 3GPP TSG-RAN WG2 #59, R2-073327, Aug. 2007.

3rd Generation Partnership Project: "3GPP TS 36.213 V8.4.0 Technical Specification Group Radio Access Network; Evolved Universal Terrestrial Radio Access (E-UTRA); Physical layer procedures (Release 8)" [Online] Sep. 1, 2008, pp. 1-60, XP002581188 Retrieved from the Internet: URL:http://www.3gpp.org/ftp/Specs/archive/36_series/36.213/36213-840.zip> [retrieved on May 6, 2010] p. 30-p. 32.

"3rd Generation Partnership Project; Technical Specification Group Radio Access Network; Evolved Universal Terrestrial Radio Access (E-UTRA); Physical layer procedures (Release 8)" 3GPP Standard; 3GPP TS 36.213, 3RDGENERATION Partnership Project (3GPP), Mobile Competence Centre; 650, Route Deslucioles; F-06921 Sophia-Antipolis Cedex; France, No. V8.3.0, Nov. 2008, pp. 1-46.

Taiwan Search Report—TW098127166—TIPO—May 14, 2013.

TSG-RAN WG1: "LS reply on PDCCH for DL data arrival and random access response format", 3GPP TSG RAN WG1 Meeting #53, R1-082251, May 5-9, 2008.

* cited by examiner

```
┌─────────────────────────────────────────────────────────────┐
│  Resource Allocations of Type 2 Truncated Random Access     │
│              Response (RAR) Encoding/Decoding 1000          │
└─────────────────────────────────────────────────────────────┘
                              ↓
┌─────────────────────────────────────────────────────────────┐
│  Setting of 1-bit Flag Carried on Associated PDDCH Indicates │
│  to Scheduled UE a Set of Contiguously Allocated Localized   │
│  VRBs or Distributed VRB  1002                               │
└─────────────────────────────────────────────────────────────┘
                              ↓
┌─────────────────────────────────────────────────────────────┐
│  Localized VRB Allocations Vary 1 VRB to Max Bandwidth VRBs  │
│  or Distributed VRB Allocations Vary 1 VRB up to $N_{rb}^{dl}$ VRBs │
│  if $N_{rb}^{dl}$ is 6-49 and vary from a single VRB up to 16 │
│  if $N_{rb}^{dl}$ is 50-110  1004                            │
└─────────────────────────────────────────────────────────────┘
                              ↓
┌─────────────────────────────────────────────────────────────┐
│  Define for Type 2 Resource Allocation Field as RIV          │
│  corresponding to $RB_{start}$ and Length in Terms of        │
│  $L_{CRBs}$  1006                                            │
└─────────────────────────────────────────────────────────────┘
                              ↓
┌─────────────────────────────────────────────────────────────┐
│  If $(L_{CRBs} - 1) \le [N_{RB}^{DL} / 2]$ then              │
│  $RIV = N_{RB}^{DL}(L_{CRBs} - 1) + RB_{start}$              │
│  else $RIV = N_{RB}^{DL}(N_{RB}^{DL} - L_{CRBs} + 1) +       │
│  (N_{RB}^{DL} - 1 - RB_{start})$  1008                       │
└─────────────────────────────────────────────────────────────┘
                              ↓
┌─────────────────────────────────────────────────────────────┐
│  Higher Layers Process RAR & Provide to PHY in Relation to   │
│  UL Grant:                                                   │
│      - Hopping flag – 1 bit;                                 │
│      - Fixed size resource block assignment – 10 bits;       │
│      - Truncated modulation and coding scheme – 4 bits;      │
│      - TPC command for scheduled PUSCH – 3 bits;             │
│      - UL delay – 1 bit;                                     │
│      - CQI request – 1 bit.                         1010     │
└─────────────────────────────────────────────────────────────┘
                              ↓
┌─────────────────────────────────────────────────────────────┐
│  if $N_{RB}^{UL} \le 44$, Then Truncate to b LSB, where      │
│  $b=[\log_2(N_{RB}^{UL}+1)/2)]$, and interpret the Truncated │
│  RB Assignment According to Rules for Regular DCI            │
│  format 0  1012                                              │
└─────────────────────────────────────────────────────────────┘
                              ↓
┌─────────────────────────────────────────────────────────────┐
│  Else Pre-append b bits with value set to '0' to the Fixed   │
│  Size RB assignment, Where $b=[\log_2(N_{RB}^{UL}\cdot(N_{RB}^{UL}+1)/2)]$, │
│  and Interpret the Expanded RB Assignment According to Rules │
│  for Regular DCI format 0  1014                              │
└─────────────────────────────────────────────────────────────┘
                              ↓
┌─────────────────────────────────────────────────────────────┐
│  Interpret MCS corresponding to RAR Grant as Indices 0-15 1016│
└─────────────────────────────────────────────────────────────┘
```

*FIG. 8*

HANDLING UPLINK GRANT IN RANDOM ACCESS RESPONSE

CLAIM OF PRIORITY UNDER 35 U.S.C. §119

The present Application for Patent claims priority to Provisional Application No. 61/088,308 entitled "A Method and Apparatus for Handling Uplink Grant in Wireless Communication System" filed Aug. 12, 2008, and claims priority to Provisional Application No. 61/088,327 entitled "A Method and Apparatus for Handling Uplink Grant in Wireless Communication System" filed Aug. 12, 2008, both of which are assigned to the assignee hereof and hereby expressly incorporated by reference herein.

FIELD OF INVENTION

The exemplary and non-limiting aspects described herein relate generally to wireless communications systems, methods, computer program products and devices, and more specifically to techniques for formatting an uplink grant.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS core network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

The system may utilize a resource assignment scheme in which a UE may request for resources whenever the UE has data to send on the uplink. A base station may process each resource request from the UE and may send a grant of resources to the UE. The UE may then transmit data on the uplink using the granted resources. However, uplink resources are consumed to send requests for resources, and downlink resources are consumed to send grants of resources.

While the size of an uplink grant on a physical downlink control channel (PDCCH) may be bandwidth dependant, the size of an uplink grant in a random access response (RAR) is fixed. Accordingly, there is a need to allocate an uplink grant in a random access response (RAR) that is responsive to different system bandwidths without adversely impacting random access channel (RACH) procedures for UEs.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with adjusting (i.e., reducing or expanding) the size of a PDCCH (physical downlink control channel) for uplink grant by transforming a resource block (RB) allocation of a random access response (RAR) for an uplink (UL) grant in order to adjust to system bandwidth, yet enabling a physical layer of user equipment (UE) to interpret the full information for providing to high level processing. Alternately or in addition, a Modulation and Coding Scheme (MCS) field can be reduced by constraining modulations used to enhance reducing the size of the PDCCH for bandwidth considerations or for future extensions.

In one aspect, a method for decoding a grant is provided. A grant is received on a downlink channel. A portion of the grant is detected whose length was adjusted. A resource block assignment is decoded based upon the number of uplink resource blocks.

In another aspect, at least one processor for decoding a grant is provided. A first module receives a grant on a downlink channel. A second module detects a portion of the grant whose length was adjusted. A third module decodes a resource block assignment based upon the number of uplink resource blocks.

In an additional aspect, a computer program product for decoding a grant is provided. A computer-readable storage medium comprises a first set of codes for causing a computer to receive a grant on a downlink channel. A second set of codes causes the computer to detect a portion of the grant whose length was adjusted. A third set of codes causes the computer to decode a resource block assignment based upon the number of uplink resource blocks.

In another additional aspect, an apparatus for decoding a grant is provided. Means are provided for receiving a grant on a downlink channel. Means are provided for detecting a portion of the grant whose length was adjusted. Means are provided for decoding a resource block assignment based upon the number of uplink resource blocks.

In a further aspect, an apparatus for decoding a grant is provided. A receiver receives a grant on a downlink channel. A computing platform detects a portion of the grant whose length was adjusted. The computing platform decodes a resource block assignment based upon the number of uplink resource blocks.

In yet one aspect, a method for encoding a grant is provided. A number of uplink resource blocks and a length adjustment based upon system bandwidth for the grant are determined. The resource block assignment is encoded based upon the number of uplink resource blocks to achieve the determined length adjustment. A grant is transmitted on a downlink channel.

in yet another aspect, at least one processor for encoding a grant is provided. A first module determines a number of uplink resource blocks and a length adjustment based upon system bandwidth for the grant. A second module encodes the resource block assignment based upon the number of uplink resource blocks to achieve the determined length adjustment. A third module transmits a grant on a downlink channel.

In yet an additional aspect, a computer program product for encoding a grant is provided. A computer-readable storage medium comprises a first set of codes for causing a computer to determine a number of uplink resource blocks and a length adjustment based upon system bandwidth for the grant. A second set of codes causes the computer to encode the resource block assignment based upon the number of uplink resource blocks to achieve the determined length adjustment. A third set of codes causes the computer to transmit a grant on a downlink channel.

In yet another additional aspect, an apparatus for encoding a grant is provided. Means are provided for determining a number of uplink resource blocks and a length adjustment based upon system bandwidth for the grant. Means are provided for encoding the resource block assignment based upon the number of uplink resource blocks to achieve the determined length adjustment. Means are provided for transmitting a grant on a downlink channel.

In yet a further aspect, an apparatus for encoding a grant is provided. A computing platform determines a number of uplink resource blocks and a length adjustment based upon system bandwidth for the grant. The computing platform encodes the resource block assignment based upon the number of uplink resource blocks to achieve the determined length adjustment. A transmitter transmits a grant on a downlink channel.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 8 illustrates a flow diagram of a methodology for truncated random access response;

DETAILED DESCRIPTION

Figure 1:
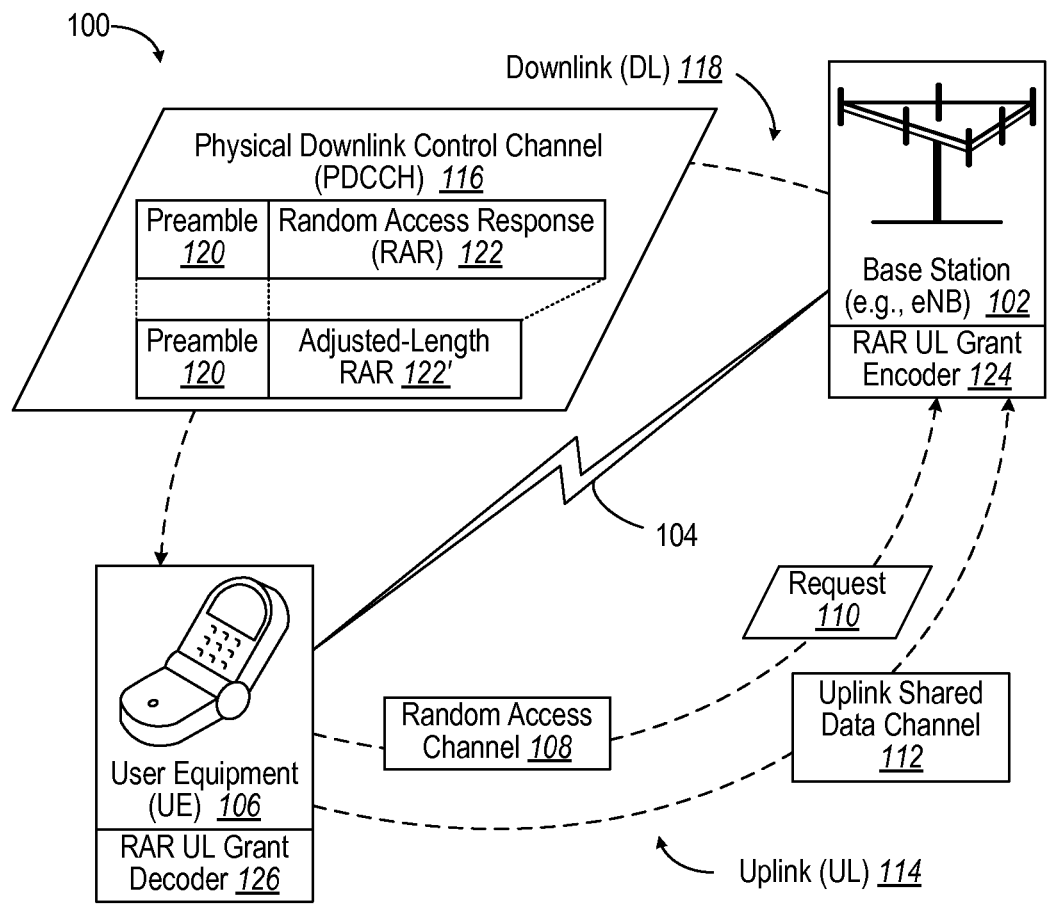
FIG. 1 illustrates a block diagram of a communication system employing a encoding of adjusted (e.g., truncated, expanded) random access responses (RAR) by a base station for accommodating system bandwidth.

A wireless communication system provides for a random access channel (RACH) procedure for user equipment (UE) to request access to an uplink channel. From a physical layer perspective, an evolved Base Station (eNB) responds with a random access response (RARP) which may echoes the detected preamble, a fixed length message containing an uplink grant, such as 21 bits or 20 bits with a reserved bit for future extensions, and other fields, such as timing advance and Cell Radio Network Temporary Identifier (C-RNTI). In answer to a need that exists for an RAR to accommodate variations in uplink system bandwidth, an approach to encoding a truncated resource block (RB) assignment of the RAR in manner in which the UE can interpret the RAR for any system bandwidth. Thereby, needs for achieving RACH procedures and existing channel resources can be realized.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, a communication system 100 of a base station, depicted as an evolved base node (eNB) 102, communicates via an over-the-air (OTA) link 104 with user equipment (UE) 106. The eNB 102 monitors a random access channel (RACH) 108 for requests 110 from UE 106 for communicating on an uplink shared data channel 112. In response, the eNB transmits a Random Access Response 116 of a shared downlink channel (DL) 118. Specific to the request 110, the RAR 116 contains a preamble 120, uplink grant and other fields [see above] 122. Responsive to the uplink system bandwidth selected, a RAR UL grant encoder 124 of the eNB 102 can advantageously truncate the data in the RAR 122 in a predictable way to create an adjusted-size RAR 122' that an RAR UL grant decoder 126 at the UE 106 can interpret the full information for higher layer processing.

Figure 2:
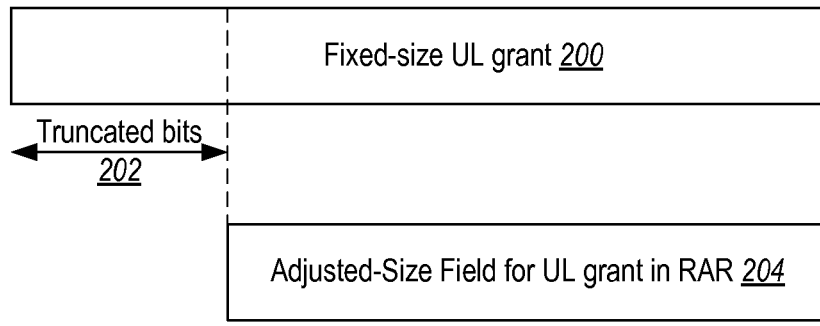
FIG. 2 illustrates block diagrams of an adjusted-size RAR of FIG. 1 achieved by truncation of an Uplink (UL) grant.

In FIG. 2, a first example of an adjusted-size RAR 122' (FIG. 1) is achieved by truncating an uplink (UL) grant 200 of a size fixed by an upper layer that supplies or consumes the information. In particular, truncated bits 202 are removed to leave a truncated UL grant 204 with an implicit understanding of constraints used in truncation such that a recipient can reconstruct the fixed-size UL grant 200. Thereby, the UL grant information can be conveyed on a system bandwidth of reduced size.

Figure 3:
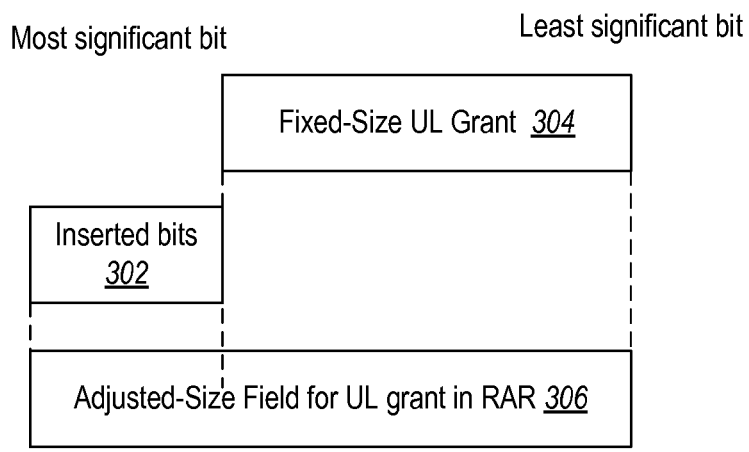
FIG. 3 illustrates block diagrams of an adjusted-size RAR of FIG. 1 achieved by expansion of an Uplink (UL) grant.

In FIG. 3, a second example of an adjusted-size RAR 122' (FIG. 1) is achieved by adding inserted bits 302 to a fixed-size UL grant 304 to achieve an expanded RAR 306 of a size appropriate for a larger system bandwidth.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 4:
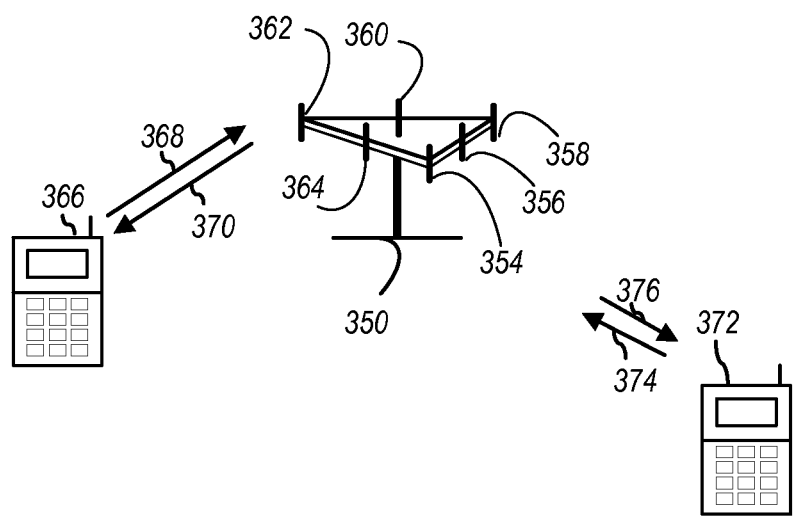
FIG. 4 illustrates a diagram of a multiple access wireless communication system according to one aspect for variable length random access responses.

Referring to FIG. 4, a multiple access wireless communication system according to one aspect is illustrated. An access point 350 (AP) includes multiple antenna groups, one including 354 and 356, another including 358 and 360, and an additional including 362 and 364. In FIG. 4, only two antennas are shown for each antenna group, however, more or fewer antennas may be utilized for each antenna group. Access terminal (AT) 366 is in communication with antennas 362 and 364, where antennas 362 and 364 transmit information to access terminal 366 over forward link 370 and receive information from access terminal 366 over reverse link 368. Access terminal 372 is in communication with antennas 356 and 358, where antennas 356 and 358 transmit information to access terminal 372 over forward link 376 and receive information from access terminal 372 over reverse link 374. In a FDD system, communication links 368, 370, 374 and 376 may use different frequency for communication. For example, forward link 370 may use a different frequency then that used by reverse link 368. Each group of antennas and/or the area in which they are designed to communicate is often referred to as a sector of the access point 350. In the aspect, antenna groups each are designed to communicate to access terminals 366, 372 in a sector of the areas covered by access point 350.

In communication over forward links 370 and 376, the transmitting antennas of access point 350 utilize beamforming in order to improve the signal-to-noise ratio of forward links for the different access terminals 366 and 374. Also, an access point using beamforming to transmit to access terminals scattered randomly through its coverage causes less interference to access terminals in neighboring cells than an access point transmitting through a single antenna to all its access terminals.

An access point 350 may be a fixed station used for communicating with the terminals and may also be referred to as an access point, a Node B, or some other terminology. An access terminal 366, 372 may also be called user equipment (UE), a wireless communication device, terminal, access terminal or some other terminology.

Figure 5:
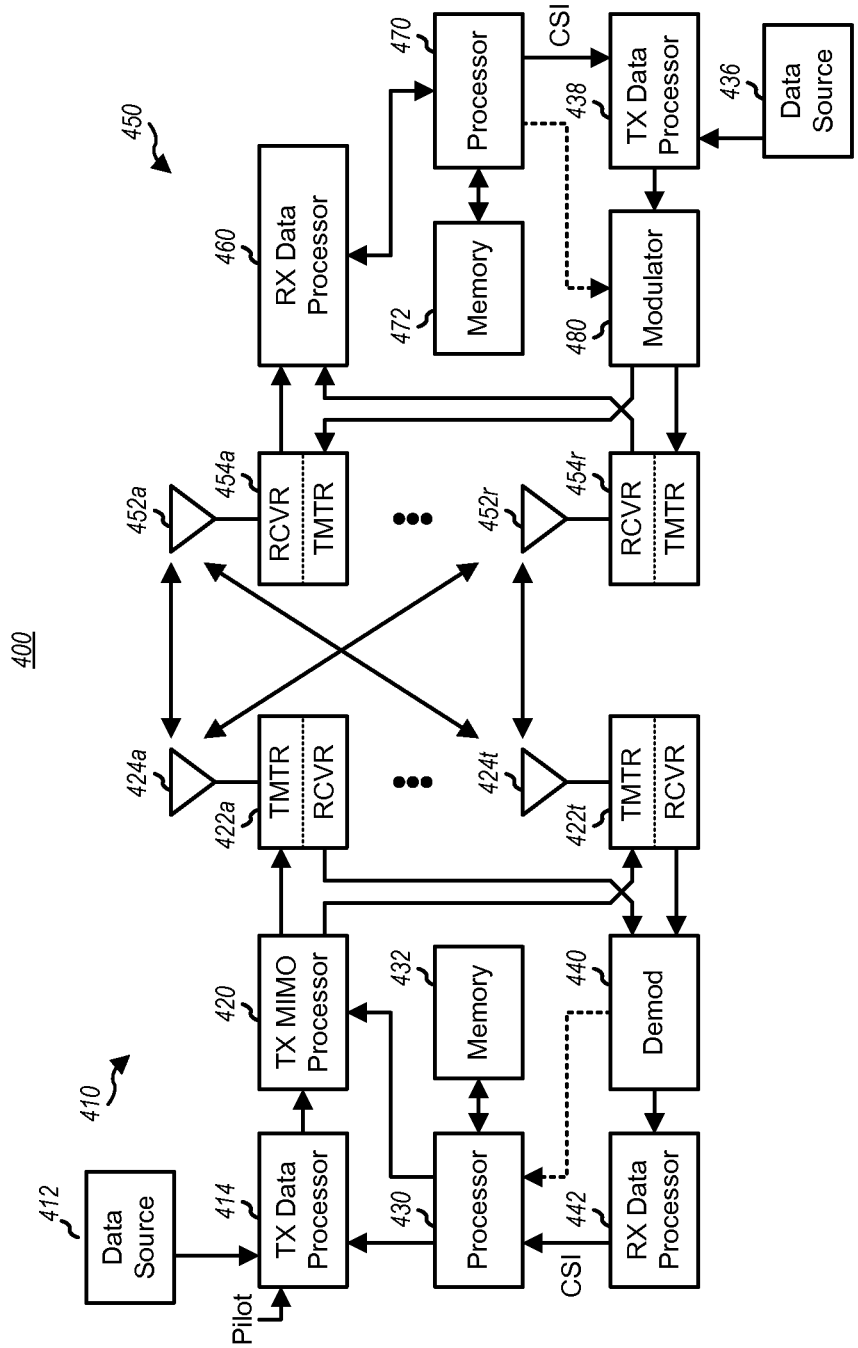
FIG. 5 illustrates a schematic block diagram of a communication system for supporting variable length random access responses.

FIG. 5 is a block diagram of an aspect of a transmitter system 410 (also known as the access point) and a receiver system 450 (also known as access terminal) in a MIMO system 400. At the transmitter system 410, traffic data for a number of data streams is provided from a data source 412 to a transmit (TX) data processor 414.

In an aspect, each data stream is transmitted over a respective transmit antenna. TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430.

The modulation symbols for all data streams are then provided to a TX MIMO processor 420, which may further process the modulation symbols (e.g., for OFDM). TX MIMO processor 420 then provides $N_T$ modulation symbol streams to $N_T$ transmitters (TMTR) 422a through 422t. In certain implementations, TX MIMO processor 420 applies beamforming weights to the symbols of the data streams and to the antenna from which the symbol is being transmitted.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Each receiver 454 conditions (e.g., filters, amplifies, and downconverts) a respective received signal, digitizes the conditioned signal to provide samples, and further processes the samples to provide a corresponding "received" symbol stream.

An RX data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves, and decodes each detected symbol stream to recover the traffic data for the data stream. The processing by RX data processor 460 is complementary to that performed by TX MIMO processor 420 and TX data processor 414 at transmitter system 410.

A processor 470 periodically determines which pre-coding matrix to use (discussed below). Processor 470 formulates a reverse link message comprising a matrix index portion and a rank value portion.

The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); Broadband Pilot Channel (BPICH).

Figure 6:
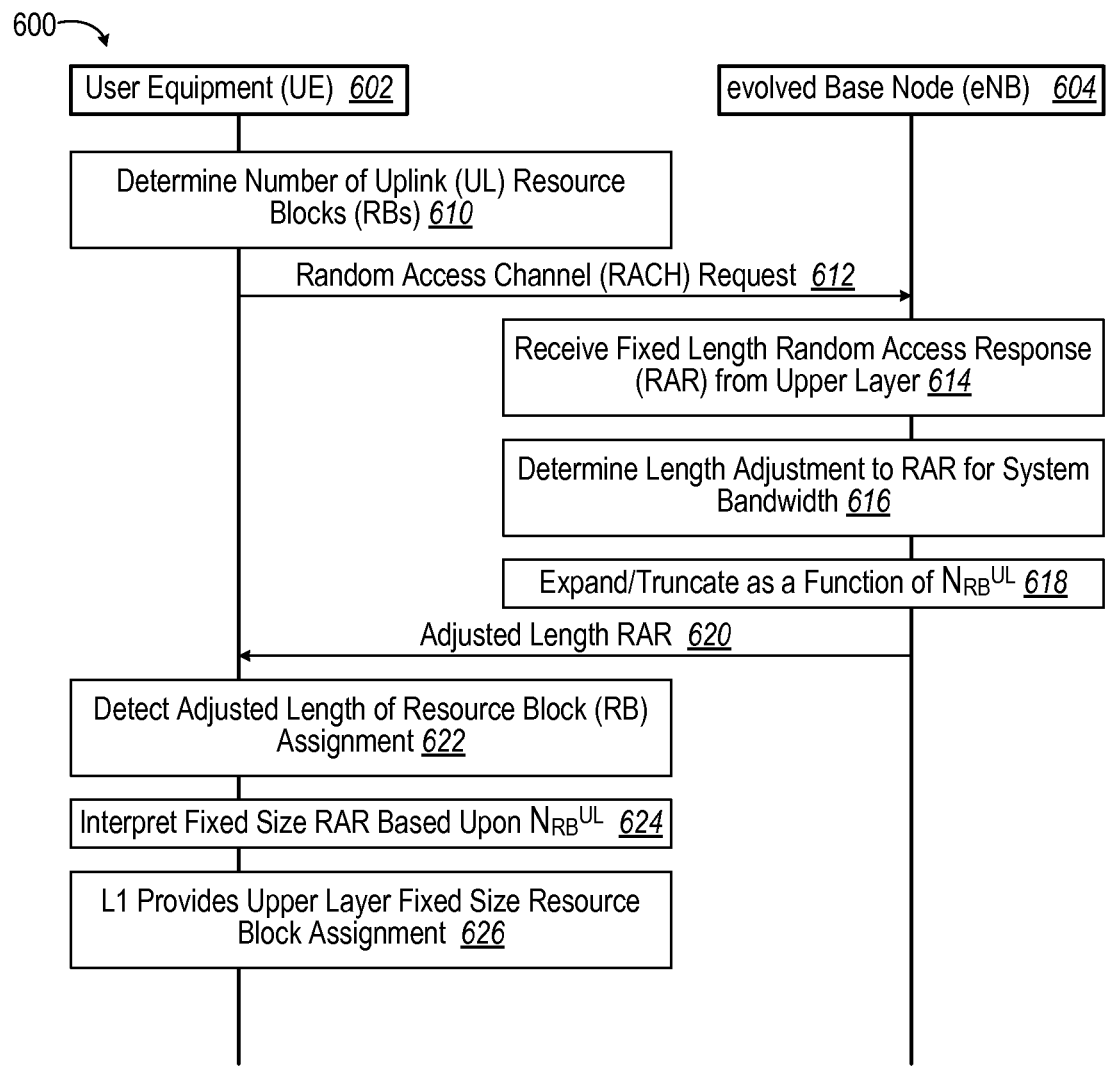
FIG. 6 illustrates a timing diagram for a methodology for User Equipment (UE) requesting uplink resources and interpreting a random access response (RAR) from an evolved Base Node (eNB)

In FIG. 6, a methodology 600 provides for User Equipment (UE) 602 is able to request uplink resources and interpret a random access response (RAR) from an evolved Base Node (eNB) 604. The RAR can have a fixed length irrespective of system bandwidth, yet not lose information. In order to do this a resource block assignment for that uplink system bandwidth is expanded or contracted in order to fit in the RAR. The UE 602 determines a number of uplink resource blocks ($N_{RB}^{UL}$) needed (block 610) and avails itself of a random access channel (RACH) procedure to make a request to the eNB 604 (block 612).

The physical L1 layer of the eNB 604 receives a fixed length random access response (RAR) from an upper layer (block 614). A determination is made as what length adjustment should be made to accommodate system bandwidth (block 616). A length adjustment to accommodate system bandwidth is made, such as by expanding/compressing a resource block (RB) assignment. This adjustment is made based upon the number of uplink resource blocks so that information is not lost (block 618). The adjusted length RAR is transmitted to the UE 602 (block 620).

The UE 602 detects the adjusted length of the RAR, and in an illustrative aspect detects the adjusted length of the RB assignment (block 622). Based upon information for the number of uplink resource blocks, the original fixed-size RAR can be determined (block 624). The L1 provides its upper layer the fixed-sized resource block assignment (block 626).

Figure 7:
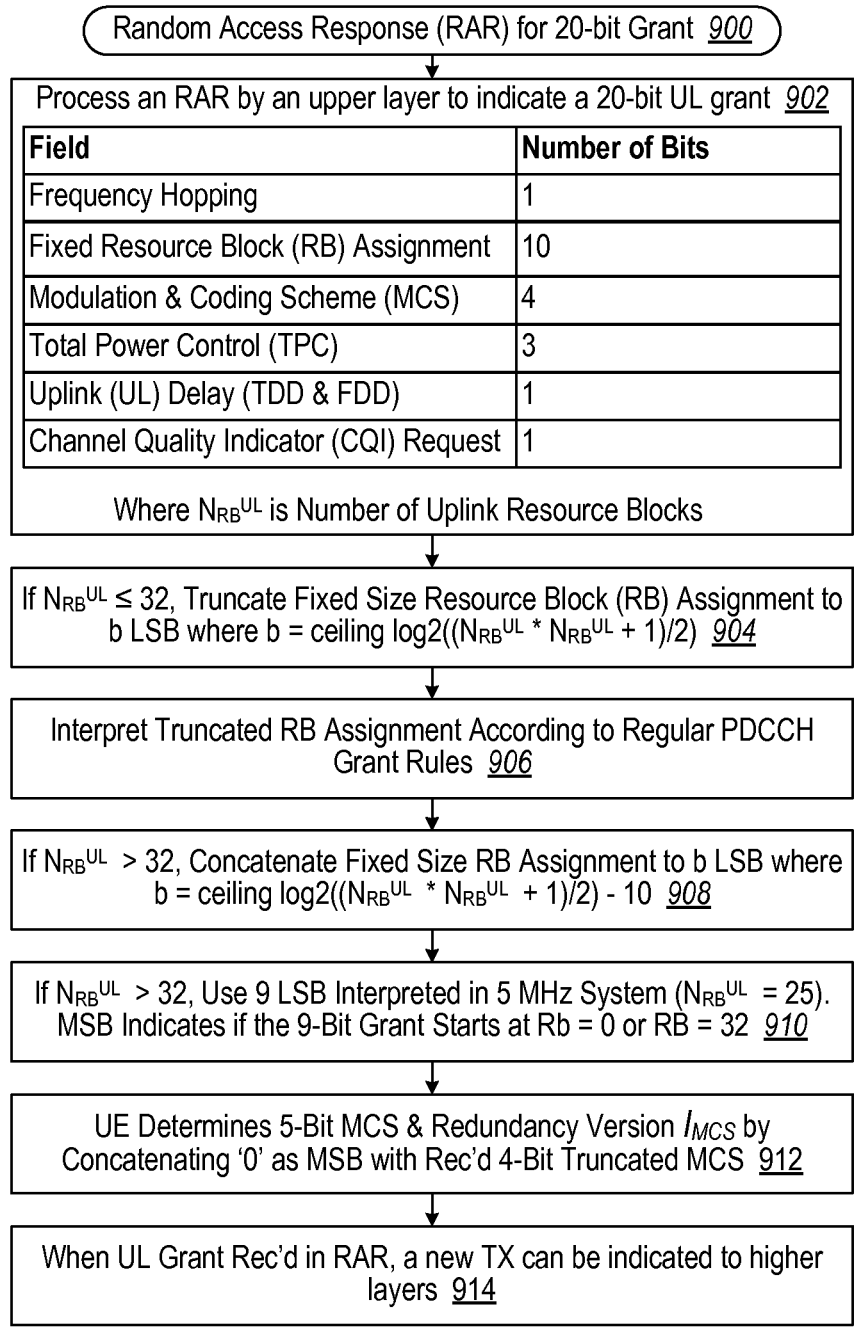
FIG. 7 illustrates a flow diagram of a methodology for random access response (RAR)

In one aspect, a methodology 900 is depicted in FIG. 7 for the Random Access Response. Processing by upper layer of the RAR indicates a 20-bit uplink grant containing the following:

Hopping flag—1 bit;
Fixed size resource block assignment—10 bits
Truncated modulation and coding scheme—4 bits;
TPC command for scheduled PUSCH—3 bits;
UL delay—1 bit; and
CQI request—1 bit (block 902).

Given that $N_{rb}^{ul}$ is the number of uplink resource blocks, if $N_{rb}^{ul}<=32$, then truncate the Fixed size resource block assignment to its b least significant bits where b=ceiling $\log_2((N_{rb}^{ul}*N_{rb}^{ul}+1)/2)$ (block 904). Interpret the truncated resource block assignment according to the rules for a regular PDCCH grant (block 906).

If $N_{rb}^{ul}>32$, concatenate b bits with value set to '0' as the most significant bits with the Fixed size resource block assignment, where b=ceiling $\log2((N_{rb}^{ul}*N_{rb}^{ul}+1)/2)-10$ (block 908). Interpret the expanded resource block assignment according to the rules for a regular PDCCH grant.

In an aspect, a method to interpret the fixed size resource block assignment provides that if $N_{rb}^{ul}>32$: use the 9 least significant bits to interpret them as in a 5 MHz system ($N_{rb}^{ul}=25$). The most significant bit indicates if the 9-bit grant (above) starts at RB=0 or RB=32 (block 910).

The UE determines the 5 bit modulation and coding scheme and redundancy version $I_{MCS}$ by concatenation of '0' as the most significant bit with the received 4 bit Truncated MCS (block 912).

When an uplink grant is received in a Random Access Response, a new transmission may be indicated to the higher layers (block 914).

In FIG. 8, a methodology 1000 for truncated random access response is depicted. In resource allocations of type 2, the resource allocation information indicates to a scheduled UE a set of contiguously allocated localized virtual resource blocks (VRBs) or distributed virtual resource blocks depending on the setting of a 1-bit flag carried on the associated PDCCH (block 1002). Localized VRB allocations for a UE vary from a single VRB up to a maximum number of VRBs spanning the system bandwidth. Distributed VRB allocations for a UE vary from a single VRB up to $N_{rb}^{dl}$ VRBs if $N_{rb}^{dl}$ is 6-49 and vary from a single VRB up to 16 if $N_{rb}^{dl}$ is 50-110 (block 1004).

A type 2 resource allocation field consists of a resource indication value (RIV) corresponding to a starting resource block ($RB_{start}$) and a length in terms of contiguously allocated resource blocks ($L_{CRBs}$) (block 1006). In block 1008, the resource indication value is defined by if $(L_{CRBs}-1) \le \lfloor N_{RB}^{DL}/2 \rfloor$ then $RIV = N_{RB}^{DL}(L_{CRBs}-1)+RB_{start}$ else $RIV = N_{RB}^{DL}(N_{RB}^{DL}-L_{CRBs}+1)+(N_{RB}^{DL}-1-RB_{start})$ In another aspect in block 1010, the higher layers process the Random Access Response and provide the following information to the physical layer:

Hopping flag—1 bit;
Fixed size resource block assignment—10 bits;
Truncated modulation and coding scheme—4 bits;
TPC command for scheduled PUSCH—3 bits;
UL delay—1 bit;
CQI request—1 bit.

In relation to the UL grant corresponding to the Random Access Response. The fixed size resource block assignment field is interpreted as follows:

if $N_{RB}^{UL} \le 44$

Truncate the fixed size resource block assignment to its b least significant bits, where b=$\lceil \log_2(N_{RB}^{UL} \cdot (N_{RB}^{UL}+1)/2) \rceil$, and interpret the truncated resource block assignment according to the rules for a regular downlink control information (DCI) format 0 (block 1012)

else

Pre-append b bits with value set to '0' to the fixed size resource block assignment, where b=$(\lceil \log_2(N_{RB}^{UL} \cdot (N_{RB}^{UL}+1)/2) \rceil -10)$, and interpret the expanded resource block assignment according to the rules for a regular DCI format 0 (block 1014)

end if

The truncated modulation and coding scheme field is interpreted such that the modulation and coding scheme corresponding to the Random Access Response grant is determined from MCS indices 0 through 15 (block 1016).

Figure 9:
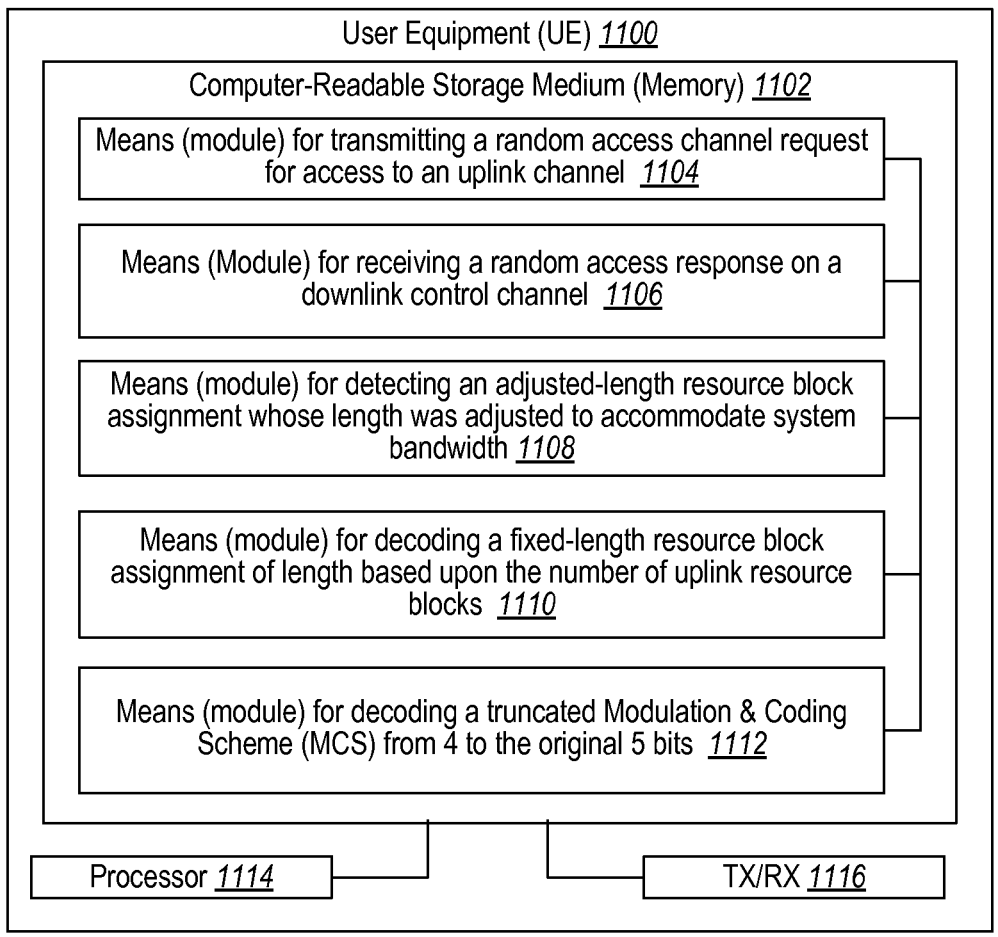
FIG. 9 illustrates a block diagram of user equipment having modules for receiving and interpreting truncated random access responses.

In FIG. 9, an access terminal (e.g., user equipment) 1100 has computing platform 1102 that provides means for causing a computer to decode a fixed length random access response coded for limited system bandwidth received from a base node (FIG. 12). In particular, the computing platform 1102 comprises sets of instructions or code (modules) 1104-1112 executable by a processor 1114 that also controls transmission and reception by a transceiver ("Tx/Rx") 1116. In particular, means (module) 1104 are provided for transmitting a random access channel request for access to an uplink channel. Means (module) 1106 are provided for receiving a random access response on a downlink control channel. Means (module) 1108 are provided for detecting an adjusted-length resource block assignment whose length was adjusted to accommodate system bandwidth. Means (module) 1110 are provided for decoding a resource block assignment of length based upon the number of uplink resource blocks. Means (module) 1112 are provided for decoding a truncated Modulation & Coding Scheme (MCS) from 4 bits to the original 5 bits.

Figure 10:
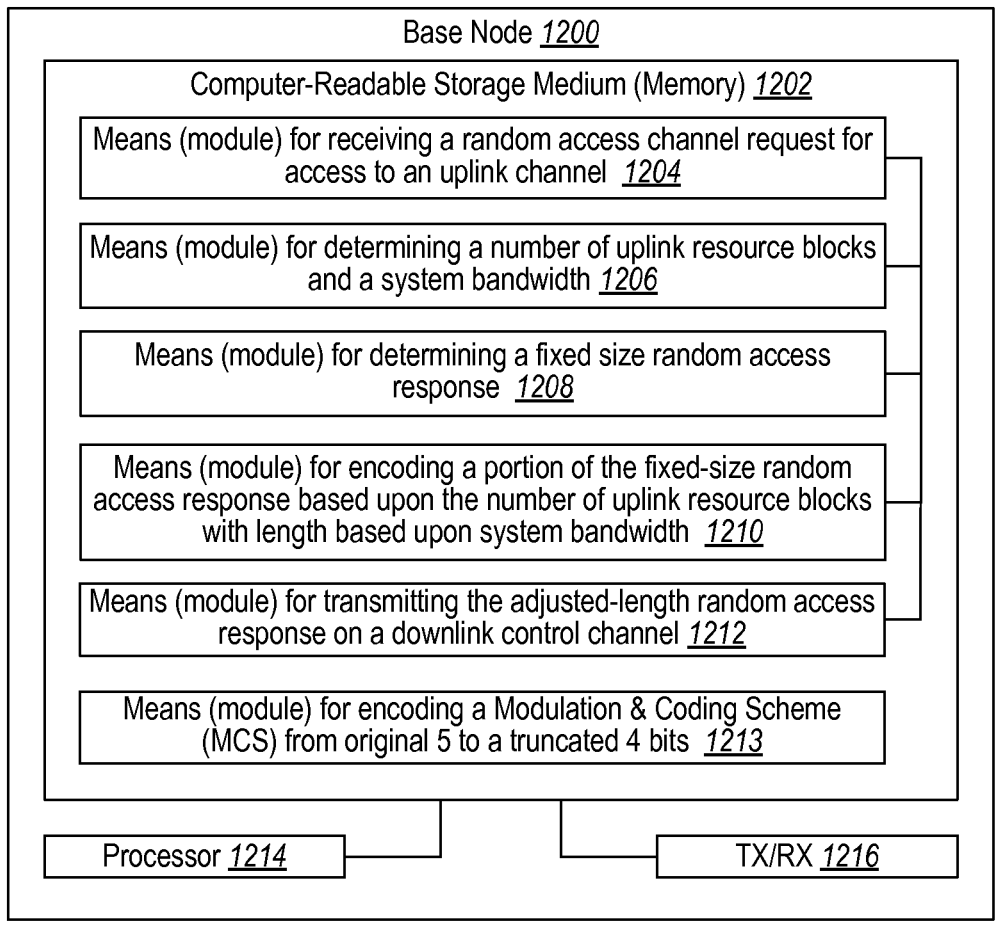
FIG. 10 illustrates a block diagram of base node having modules for truncating and transmitting random access responses.

In FIG. 10, an evolved Base Node (eNB) 1200 has computing platform 1202 that provides means for causing a computer to encode a fixed length random access response coded for limited system bandwidth. In particular, the computing platform 1202 comprises sets of instructions or code (modules) 1204-1213 executable by a processor 1214 that also controls transmission and reception by a transceiver ("Tx/Rx") 1216. In particular, means (module) 1204 are provided for receiving a random access channel request for access to an uplink channel. Means (module) 1206 are provided for determining a number of uplink resource blocks and a system bandwidth. Means (module) 1208 are provided for determining a fixed size random access response. Means (module) 1210 are provided for encoding a portion of the fixed-size random access response based upon the number of uplink resource blocks with length based upon system bandwidth. Means (module) 1212 are provided for transmitting the adjusted-length random access response on a downlink control channel. Means (module) 1213 are provided for encoding an original Modulation & Coding Scheme (MCS) from 5 bits to a truncated 4 bits.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, comprising:
receiving a grant on a downlink channel, wherein a length of a portion of the grant has been adjusted; and
interpreting a resource block assignment of the portion of the grant, the interpreting the resource block assignment being based upon whether or not a number of uplink resource blocks ($N_{RB}^{UL}$) exceeds a threshold, wherein the interpreting the resource block assignment includes:
determining that $N_{RB}^{UL} \leq 44$; and
responsive to determining that $N_{RB}^{UL} \leq 44$, truncating the resource block assignment to its b least significant bits, where $b = \lceil \log_2(N_{RB}^{UL} \cdot (N_{RB}^{UL}+1)/2) \rceil$, and interpreting the truncated resource block assignment according to rules for a regular downlink control information (DCI) format 0.

2. The method of claim 1, further comprising detecting the adjusted length portion of the grant comprising a cropped or expanded resource block assignment in accordance with a system bandwidth.

3. The method of claim 1, further comprising interpreting further truncation of the grant by detecting an indication in a physical layer that a new transmission is requested when an uplink grant is received in a random access response (RAR).

4. The method of claim 3, further comprising detecting on a physical layer that a new transmission is requested when an uplink grant is received in a RAR.

5. The method of claim 1, further comprising interpreting the adjusted length grant to satisfy a fixed-sized format of a 1-bit frequency hopping flag, a 10-bit fixed size resource block assignment, a five-bit modulation and coding scheme, a four-bit total power control for scheduled physical uplink (PUSCH), a 1-bit uplink delay, and a 1-bit channel quality indication (CQI) request.

6. The method of claim 1, further comprising:
receiving resource allocation information indicated as a set of contiguously allocated localized virtual resource blocks (VRBs) or distributed VRBs depending on a setting of a 1-bit flag carried on an associated physical downlink control channel (PDCCH), wherein localized VRB allocations vary from a single VRB up to a maximum number of VRBs spanning a system bandwidth, and wherein distributed VRB allocations vary from a single VRB up to is a number of downlink resource blocks ($N_{rb}^{dl}$) VRBs if $N_{rb}^{dl}$ is 6-49 and vary from a single VRB up to 16 if $N_{rb}^{dl}$ is 50-110; and
determining resource indication value $RIV=N_{RB}^{DL}(L_{CRBs}-1)+RB_{start}$ if $(L_{CRBs}-1) \leq [N_{RB}^{DL}/2]$ else $RIV=N_{RB}^{DL}(N_{RB}^{DL}-L_{CRBs}+1)+(N_{RB}^{DL}-1-RB_{start})$, given a resource allocation field consists of a resource indication value (RIV) corresponding to a starting resource block ($RB_{start}$) and a length in terms of contiguously allocated resource blocks ($L_{CRBs}$).

7. The method of claim 1, further comprising interpreting a truncated modulation and coding scheme (MCS) as indices 0-15 omitting a highest modulation.

8. The method of claim 1, wherein the interpreting the resource block assignment further includes:
determining that $N_{RB}^{UL}>44$; and
responsive to determining that $N_{RB}^{UL}>44$, inserting b most significant bits with value set to '0' in the resource block assignment, where $b=(\lceil \log_2(N_{RB}^{UL} \cdot (N_{RB}^{UL}+1)/2) \rceil - 10)$, and interpreting the expanded resource block assignment according to the rules for the regular DCI format 0.

9. A computer program product for wireless communication, comprising:
a computer-readable memory comprising,
a first set of codes for causing at least one computer to receive a grant on a downlink channel,
wherein a length of a portion of the grant has been adjusted; and
a second set of codes for causing the at least one computer to interpret a resource block assignment of the portion of the grant, the interpretation of the resource block assignment being based upon whether or not a number of uplink resource blocks ($N_{RB}^{UL}$) exceeds a threshold, wherein the interpretation includes:
determining that $N_{RB}^{UL} \leq 44$; and
responsive to determining that $N_{RB}^{UL} \leq 44$, truncating the resource block assignment to its b least significant bits, where $b=\lceil \log_2(N_{RB}^{UL} \cdot (N_{RB}^{UL}+1)/2) \rceil$, and interpreting the truncated resource block assignment according to rules for a regular downlink control information (DCI) format 0.

10. The computer program product of claim 9, wherein the interpretation further includes:
determining that $N_{RB}^{UL}>44$; and
responsive to determining that $N_{RB}^{UL}>44$, inserting b most significant bits with value set to '0' in the resource block assignment, where $b=(\lceil \log_2(N_{RB}^{UL} \cdot (N_{RB}^{UL}+1)/2) \rceil - 10)$, and interpreting the expanded resource block assignment according to the rules for the regular DCI format 0.

11. An apparatus for wireless communication, comprising:
means for receiving a grant on a downlink channel, wherein a length of a portion of the grant has been adjusted; and
means for interpreting a resource block assignment of the portion of the grant, the interpreting the resource block assignment being based upon whether or not a number of uplink resource blocks ($N_{RB}^{UL}$) exceeds a threshold, wherein the means for interpreting the resource block assignment includes:
means for determining that $N_{RB}^{UL} \leq 44$; and
responsive to determining that $N_{RB}^{UL} \leq 44$, means for truncating the resource block assignment to its b least significant bits, where $b=\lceil \log_2(N_{RB}^{UL} \cdot (N_{RB}^{UL}+1)/2) \rceil$, and means for interpreting the truncated resource block assignment according to rules for a regular downlink control information (DCI) format 0.

12. The apparatus of claim 11, wherein the means for interpreting the resource block assignment further includes:
means for determining that $N_{RB}^{UL}>44$; and
responsive to determining that $N_{RB}^{UL}>44$, means for inserting b most significant bits with value set to '0' in the resource block assignment, where $b=(\lceil \log_2(N_{RB}^{UL} \cdot (N_{RB}^{UL}+1)/2) \rceil - 10)$, and means for interpreting the expanded resource block assignment according to the rules for the regular DCI format 0.

13. An apparatus for wireless communication, comprising:
a receiver for receiving a grant on a downlink channel,
wherein a length of a portion of the grant has been adjusted; and
a computing platform for interpreting a resource block assignment of the portion of the grant, the interpreting the resource block assignment being based upon whether or not a number of uplink resource blocks ($N_{RB}^{UL} \leq 44$) exceeds a threshold, wherein the interpretation includes:
determining that $N_{RB}^{UL} \leq 44$; and
responsive to determining that $N_{RB}^{UL} \leq 44$, truncating the resource block assignment to its b least significant bits, where $b=\lceil \log_2(N_{RB}^{UL} \cdot (N_{RB}^{UL}+1)/2) \rceil$, and interpreting the truncated resource block assignment according to rules for a regular downlink control information (DCI) format 0.

14. The apparatus of claim 13, further comprising the computing platform for detecting the adjusted length portion of the grant comprising a cropped or expanded resource block assignment in accordance with a system bandwidth.

15. The apparatus of claim 13, further comprising the computing platform for interpreting further truncation of the grant by detecting an indication in a physical layer that a new transmission is requested when an uplink grant is received in a random access response (RAR).

16. The apparatus of claim 15, further comprising the computing platform for detecting on a physical layer that a new transmission is requested when an uplink grant is received in a RAR.

17. The apparatus of claim 13, further comprising the computing platform for interpreting the adjusted length grant to satisfy a format of a 1-bit frequency hopping flag, a 10-bit resource block assignment, a five-bit modulation and coding scheme, a four-bit total power control for scheduled physical uplink (PUSCH), a 1-bit uplink delay, and a 1-bit channel quality indication (CQI) request.

18. The apparatus of claim 13, further comprising:
the receiver for receiving resource allocation information indicated as a set of contiguously allocated localized virtual resource blocks (VRBs) or distributed VRBs depending on a setting of a 1-bit flag carried on an associated physical downlink control channel (PDCCH), wherein localized VRB allocations vary from a single VRB up to a maximum number of VRBs spanning a system bandwidth, and wherein distributed VRB allocations vary from a single VRB up to is a number of downlink resource blocks ($N_{rb}^{dl}$) VRBs if $N_{rb}^{dl}$ is 6-49 and vary from a single VRB up to 16 if $N_{rb}^{dl}$ is 50-110; and the computing platform for determining resource indication value $RIV=N_{RB}^{DL}(L_{CRBs}-1)+RB_{start}$ if $(L_{CRBs}-1) \leq [N_{RB}^{DL}/2]$ else $RIV=N_{RB}^{DL}(N_{RB}^{DL}-L_{CRBs}+1)+(N_{RB}^{DL}-1-RB_{start})$, given a resource allocation field consists of a resource indication value (RIV) corresponding to a starting resource block ($RB_{start}$) and a length in terms of contiguously allocated resource blocks ($L_{CRBs}$).

19. The apparatus of claim 13, further comprising the computing platform for interpreting a truncated modulation and coding scheme (MCS) as indices 0-15 omitting a highest modulation.

20. The apparatus of claim 13, wherein the interpretation further includes:
   determining that $N_{RB}^{UL}>44$; and
   responsive to determining that $N_{RB}^{UL}>44$, inserting b most significant bits with value set to '0' in the resource block assignment, where $b=(\lceil \log_2(N_{RB}^{UL} \cdot (N_{RB}^{UL}+1)/2) \rceil -10)$, and interpreting the expanded resource block assignment according to the rules for the regular DCI format 0.

21. A method for wireless communication, comprising:
   determining a number of uplink resource blocks ($N_{RB}^{UL}$) and a length adjustment based upon a system bandwidth;
   encoding a resource block assignment based upon the number of uplink resource blocks ($N_{RB}^{UL}$) to achieve the determined length adjustment; and
   transmitting a grant including the resource block assignment on a downlink channel, wherein the resource block assignment is encoded to be interpreted as:
      if $N_{RB}^{UL} \leq 44$, then truncate the resource block assignment to its b least significant bits, where $b=\lceil \log_2 (N_{RB}^{UL} \cdot (N_{RB}^{UL}+1)/2) \rceil$, and interpret the truncated resource block assignment according to rules for a regular downlink control information (DCI) format 0.

22. The method of claim 21, further comprising adjusting a length of the grant by cropping or expanding the resource block assignment in accordance with the system bandwidth.

23. The method of claim 21, further comprising truncating further the grant by transmitting an indication in a physical layer that a new transmission is requested when an uplink grant is transmitted in a random access response (RAR).

24. The method of claim 23, further comprising transmitting on a physical layer that a new transmission is requested when an uplink grant is transmitted in a RAR.

25. The method of claim 21, further comprising encoding the adjusted length grant to satisfy a format of a 1-bit frequency hopping flag, a 10-bit resource block assignment, a five-bit modulation and coding scheme, a four-bit total power control for scheduled physical uplink (PUSCH), a 1-bit uplink delay, and a 1-bit channel quality indication (CQI) request.

26. The method of claim 21, further comprising:
   transmitting resource allocation information indicated as a set of contiguously allocated localized virtual resource blocks (VRBs) or distributed VRBs depending on a setting of a 1-bit flag carried on an associated physical downlink control channel (PDCCH), wherein localized VRB allocations vary from a single VRB up to a maximum number of VRBs spanning a system bandwidth, and wherein distributed VRB allocations vary from a single VRB up to is a number of downlink resource blocks ($N_{rb}^{dl}$) VRBs if $N_{rb}^{dl}$ is 6-49 and vary from a single VRB up to 16 if $N_{rb}^{dl}$ is 50-110; and
   determining resource indication value $RIV=N_{RB}^{DL}(L_{CRBs}-1)+RB_{start}$ if $(L_{CRBs}-1) \leq [N_{RB}^{DL}/2]$ else $RIV=N_{RB}^{DL}(N_{RB}^{DL}-L_{CRBs}+1)+(N_{RB}^{DL}-1-RB_{start})$, given a resource allocation field consists of a resource indication value (RIV) corresponding to a starting resource block ($RB_{start}$) and a length in terms of contiguously allocated resource blocks ($L_{CRBs}$).

27. The method of claim 21, further comprising truncating modulation and coding scheme (MCS) as indices 0-15 omitting a highest modulation.

28. The method of claim 21, wherein the resource block assignment is encoded to be further interpreted as:
   if $N_{RB}^{UL}>44$, then insert b most significant bits with value set to '0' in the resource block assignment, where $b=(\lceil \log_2(N_{RB}^{UL} \cdot (N_{RB}^{UL}+1)/2) \rceil -10)$, and interpret the expanded resource block assignment according to the rules for the regular DCI format 0.

29. A computer program product for wireless communication, comprising:
   a computer-readable memory comprising,
      a first set of codes for causing a computer to determine a number of uplink resource blocks ($N_{RB}^{UL}$) and a length adjustment based upon a system bandwidth;
      a second set of codes for causing the computer to encode a resource block assignment based upon the number of uplink resource blocks ($N_{RB}^{UL}$) to achieve the determined length adjustment; and
      a third set of codes for causing the computer to transmit a grant including the resource block assignment on a downlink channel, wherein the resource block assignment is encoded to be interpreted as:
         if $N_{RB}^{UL} \leq 44$, then truncate the resource block assignment to its b least significant bits where $b=\lceil \log_2 (N_{RB}^{UL} \cdot (N_{RB}^{UL}+1)/2) \rceil$, and interpret the truncated resource block assignment according to rules for a regular downlink control information (DCI) format 0.

30. The computer program product of claim 29, wherein the resource block assignment is encoded to be further interpreted as:
   if $N_{RB}^{UL}>44$, then insert b most significant bits with value set to '0' in the resource block assignment, where $b=(\lceil \log_2(N_{RB}^{UL} \cdot (N_{RB}^{UL}+1)/2) \rceil -10)$, and interpret the expanded resource block assignment according to the rules for the regular DCI format 0.

31. An apparatus for wireless communication, comprising:
   means for determining a number of uplink resource blocks ($N_{RB}^{UL}$) and a length adjustment based upon a system bandwidth;
   means for encoding a resource block assignment based upon the number of uplink resource blocks ($N_{RB}^{UL}$) to achieve the determined length adjustment; and
   means for transmitting a grant including the resource block assignment on a downlink channel, wherein the resource block assignment is encoded to be interpreted as:
      if $N_{RB}^{UL} \leq 44$, then truncate the resource block assignment to its b least significant bits, where $b=\lceil \log_2 (N_{RB}^{UL} \cdot (N_{RB}^{UL}+1)/2) \rceil$, and interpret the truncated resource block assignment according to rules for a regular downlink control information (DCI) format 0.

32. The apparatus of claim 31, wherein the resource block assignment is encoded to be further interpreted as:
   if $N_{RB}^{UL}>44$, then insert b most significant bits with value set to '0' in the resource block assignment, where $b=(\lceil \log_2(N_{RB}^{UL} \cdot (N_{RB}^{UL}+1)/2) \rceil -10)$, and interpret the expanded resource block assignment according to the rules for the regular DCI format 0.

33. An apparatus for wireless communication, comprising:

a computing platform for determining a number of uplink resource blocks ($N_{RB}^{UL}$) and a length adjustment based upon a system bandwidth;

the computing platform for encoding a resource block assignment based upon the number of uplink resource blocks ($N_{RB}^{UL}$) to achieve the determined length adjustment; and a transmitter for transmitting a grant including the resource block assignment on a downlink channel, wherein the resource block assignment is encoded to be interpreted as:

if $N_{RB}^{UL} \leq 44$, then truncate the resource block assignment to its b least significant bits, where $b = \lceil \log_2 (N_{RB}^{UL} \cdot (N_{RB}^{UL}+1)/2) \rceil$, and interpret the truncated resource block assignment according to rules for a regular downlink control information (DCI) format 0.

34. The apparatus of claim 33, further comprising the computing platform for adjusting a length of the grant by cropping or expanding the resource block assignment in accordance with the system bandwidth.

35. The apparatus of claim 33, further comprising the computing platform for truncating further the grant by transmitting an indication in a physical layer that a new transmission is requested when an uplink grant is transmitted in a random access response (RAR).

36. The apparatus of claim 35, further comprising the transmitter for transmitting on a physical layer that a new transmission is requested when an uplink grant is transmitted in a RAR.

37. The apparatus of claim 33, further comprising the computing platform for encoding the adjusted length grant to satisfy a format of a 1-bit frequency hopping flag, a 10-bit resource block assignment, a five-bit modulation and coding scheme, a four-bit total power control for scheduled physical uplink (PUSCH), a 1-bit uplink delay, and a 1-bit channel quality indication (CQI) request.

38. The apparatus of claim 33, further comprising:

the transmitter for transmitting resource allocation information indicated as a set of contiguously allocated localized virtual resource blocks (VRBs) or distributed VRBs depending on a setting of a 1-bit flag carried on an associated physical downlink control channel (PDCCH), wherein localized VRB allocations vary from a single VRB up to a maximum number of VRBs spanning the system bandwidth, and wherein distributed VRB allocations vary from a single VRB up to is the number of downlink resource blocks ($N_{rb}^{dl}$) VRBs if $N_{rb}^{dl}$ is 6-49 and vary from a single VRB up to 16 if $N_{rb}^{dl}$ is 50-110; and the computing platform for determining resource indication value $RIV = N_{RB}^{DL}(L_{CRBs}-1) + RB_{start}$ if $(L_{CRBs}-1) \leq [N_{RB}^{DL}/2]$ else $RIV = N_{RB}^{DL}(N_{RB}^{DL}-L_{CRBs}+1) + (N_{RB}^{DL}-1-RB_{start})$, given a resource allocation field consists of a resource indication value (RIV) corresponding to a starting resource block ($RB_{start}$) and a length in terms of contiguously allocated resource blocks ($L_{CRBs}$).

39. The apparatus of claim 33, further comprising the computing platform for truncating modulation and coding scheme (MCS) as indices 0-15 omitting a highest modulation.

40. The apparatus of claim 33, wherein the resource block assignment is encoded to be further interpreted as:

if $N_{RB}^{UL} > 44$, then insert b most significant bits with value set to '0' in the resource block assignment, where $b = (\lceil \log_2(N_{RB}^{UL} \cdot (N_{RB}^{UL}+1)/2) \rceil - 10)$, and interpret the expanded resource block assignment according to the rules for the regular DCI format 0.

* * * * *